US012580413B2

(12) United States Patent
Bruschini

(10) Patent No.: US 12,580,413 B2
(45) Date of Patent: Mar. 17, 2026

(54) METHOD FOR PERFORMING A START-UP OF AN OFFSHORE PLANT WITHOUT EXTERNAL ENERGY SOURCES

(71) Applicant: NUOVO PIGNONE TECNOLOGIE-S.R.L., Florence (IT)

(72) Inventor: Marco Bruschini, Florence (IT)

(73) Assignee: Nuovo Pignone Tecnologie—S.R.L., Florence (IT)

( * ) Notice: Subject to any disclaimer, the term of this patent is extended or adjusted under 35 U.S.C. 154(b) by 0 days.

(21) Appl. No.: 18/848,334

(22) PCT Filed: Mar. 17, 2023

(86) PCT No.: PCT/EP2023/025121
§ 371 (c)(1),
(2) Date: Sep. 18, 2024

(87) PCT Pub. No.: WO2023/179909
PCT Pub. Date: Sep. 28, 2023

(65) Prior Publication Data
US 2025/0219444 A1     Jul. 3, 2025

(30) Foreign Application Priority Data
Mar. 23, 2022     (IT) ........................ 102022000005675

(51) Int. Cl.
*H02J 9/08*         (2006.01)
*H02J 3/00*         (2006.01)
(Continued)

(52) U.S. Cl.
CPC ................ *H02J 9/08* (2013.01); *H02J 3/001* (2020.01); *H02J 3/241* (2020.01); *H02J 3/32* (2013.01); *H02J 3/388* (2020.01)

(58) Field of Classification Search
CPC ...... H02J 9/08; H02J 3/00; H02J 3/001; H02J 3/24; H02J 3/241; H02J 3/32; H02J 3/38; H02J 3/388
See application file for complete search history.

(56) References Cited

U.S. PATENT DOCUMENTS 10,340,695 B2     7/2019   Ren

FOREIGN PATENT DOCUMENTS

AU         2018160354 A1     9/2018
DE     10 2015 014117 A1     5/2017
(Continued)

*Primary Examiner* — Robert L Deberadinis
(74) *Attorney, Agent, or Firm* — Paul Frank + Collins P.C.

(57) ABSTRACT

A method for performing a start-up of an offshore plant. The offshore plant comprises a power grid, wherein the power grid comprises a power generation source for generating the energy, a load driven by the power generation source and connected to the power grid, a battery energy storage system connected to the power grid and to the load, and a switching and detecting device connected to the power grid. The method comprises the steps of: detecting by the switching and detecting device, a power outage between the load and power grid; and injecting by the battery energy storage system, the energy to the power generation source to start it up, so as to restore the energy conditions on the power grid prior to the power outage. The injecting step provides the re-energization of a busbar connected to the battery energy storage system and a generator connected to a gas turbine.

6 Claims, 2 Drawing Sheets

(51) Int. Cl.
| | |
|---|---|
| *H02J 3/001* | (2026.01) |
| *H02J 3/24* | (2006.01) |
| *H02J 3/32* | (2006.01) |
| *H02J 3/38* | (2006.01) |
| *H02J 3/388* | (2026.01) |

(56) References Cited

FOREIGN PATENT DOCUMENTS

| | | | |
|---|---|---|---|
| JP | H10336903 | A | 12/1998 |
| JP | 2013230063 | A | 11/2013 |
| JP | 2018528357 | A | 9/2018 |
| WO | 2018156385 | A1 | 8/2018 |
| WO | 2018160354 | A1 | 9/2018 |
| WO | 2021/034326 | A1 | 2/2021 |

METHOD FOR PERFORMING A START-UP OF AN OFFSHORE PLANT WITHOUT EXTERNAL ENERGY SOURCES

TECHNICAL FIELD

The present disclosure concerns a method for performing a start-up of an offshore plant e.g., an islanded power plant, a floating production storage and offloading (FPSO) unit or platform without external energy sources, restoring the initial energy condition of the offshore plant following a power blackout, i.e., performing a black start of the offshore plant.

BACKGROUND ART

Systems for black-starting islanded power plants are known. In general, an islanded or offshore power plant comprises one or more gas turbines (GTs) to supply electrical energy to the offshore plant, a load, e.g., an electric generator driven machine, which is connected to the gas turbines, and auxiliary or emergency energy sources.

In particular, the auxiliary energy sources, such as diesel generators, operate as a power backup for the load, being capable of reactivating the gas turbines in the event of a power blackout.

Therefore, when the power supply from the power grid made by the gas turbines is interrupted (e.g., in the event of a blackout), the offshore plant uses the energy supplied by the diesel generators until energy is supplied from an external energy source.

However, in such systems, the energy supplied by the diesel generators is less than the energy that would be supplied by the power grid in normal operating conditions. Therefore, the energy that can be used by the diesel generators to power the load is limited until the blackout condition is restored. Furthermore, the diesel generators are unable to recreate the power conditions of the offshore plant prior to the power failure due to the blackout.

Accordingly, an improved method for performing a start-up of an offshore plant without external energy sources would be welcomed in the technology to solve the above-mentioned problems.

SUMMARY

A new method for performing a start-up of an offshore plant has been discovered and is disclosed herein.

In one aspect, the subject matter disclosed herein is directed to a method for performing a start-up of an offshore plant. The offshore plant comprises a power grid for supplying and distributing energy, wherein the power grid comprises a power generation source for generating the energy, a load driven by the power generation source—and connected to the power grid, a battery energy storage system connected to the power grid and to the load, and a switching and detecting device connected to the power grid. The method comprises the steps of detecting by the switching and detecting device, a power outage between the load and power grid and injecting by the battery energy storage system, the energy to the power generation source to start it up, so as to restore the energy conditions on the power grid prior to the power outage.

In another aspect, the subject matter disclosed herein concerns that the injecting step provides the re-energization of a busbar connected to the battery energy storage system and a generator connected to a gas turbine, in order to start an engine of the gas turbine of the power generation source by means of the power from batteries of the battery energy storage system.

In another aspect, the method further comprises the step of compensating the fluctuations of the power grid through a charge/discharge process of the battery energy storage system.

In another aspect, the method further comprises the step of comparing the value of each fluctuation of the power grid with a predeterminate threshold value, such that if the value of the fluctuation exceeds the predeterminate threshold value, the detecting step is carried out; or if the value of the fluctuation does not exceed the predeterminate threshold value, the compensating step is carried out.

In another aspect, the subject matter disclosed herein concerns that the battery energy storage system comprises a plurality of inverters for converting an input direct current into an output alternating current, a plurality of filters for reducing disturbances on the supply line, a connecting device and a plurality of transformers.

In another aspect, the subject matter disclosed herein is directed to an Offshore plant such as a platform and the like. The offshore plant comprises a power grid for supplying and distributing energy, wherein the power grid comprises a power generation source for generating the energy, a load driven by the power generation source and connected to the power grid, a battery energy storage system connected to the power grid and to the load, and a switching and detecting device connected to the power grid, wherein the switching and detecting device is capable of detecting a power outage between the load and power grid, and wherein the battery energy storage system is capable of injecting the energy to the power generation source to start it up, so as to restore the energy conditions on the power grid prior to the power outage.

In another aspect, the power generation source comprises a gas turbine, a generator connected to the gas turbine and an engine connected to the gas turbine for start-up the gas turbine.

BRIEF DESCRIPTION OF THE DRAWINGS

A more complete appreciation of the disclosed embodiments of the invention and many of the attendant advantages thereof will be readily obtained as the same becomes better understood by reference to the following detailed description when considered in connection with the accompanying drawings, wherein.

DETAILED DESCRIPTION OF EMBODIMENTS

In the case of power blackout of an offshore plant, the power supply from the power grid is interrupted. Therefore, the offshore plant uses the energy supplied by the diesel generators. The diesel generators operate as a power backup for the offshore plant. However, such diesel generators supply less energy than the energy required by the power grid in normal operating conditions. According to one aspect of the invention, a battery energy storage system (BESS) is provided for restoring the initial energy condition of the offshore plant following a power blackout.

Figure 1:
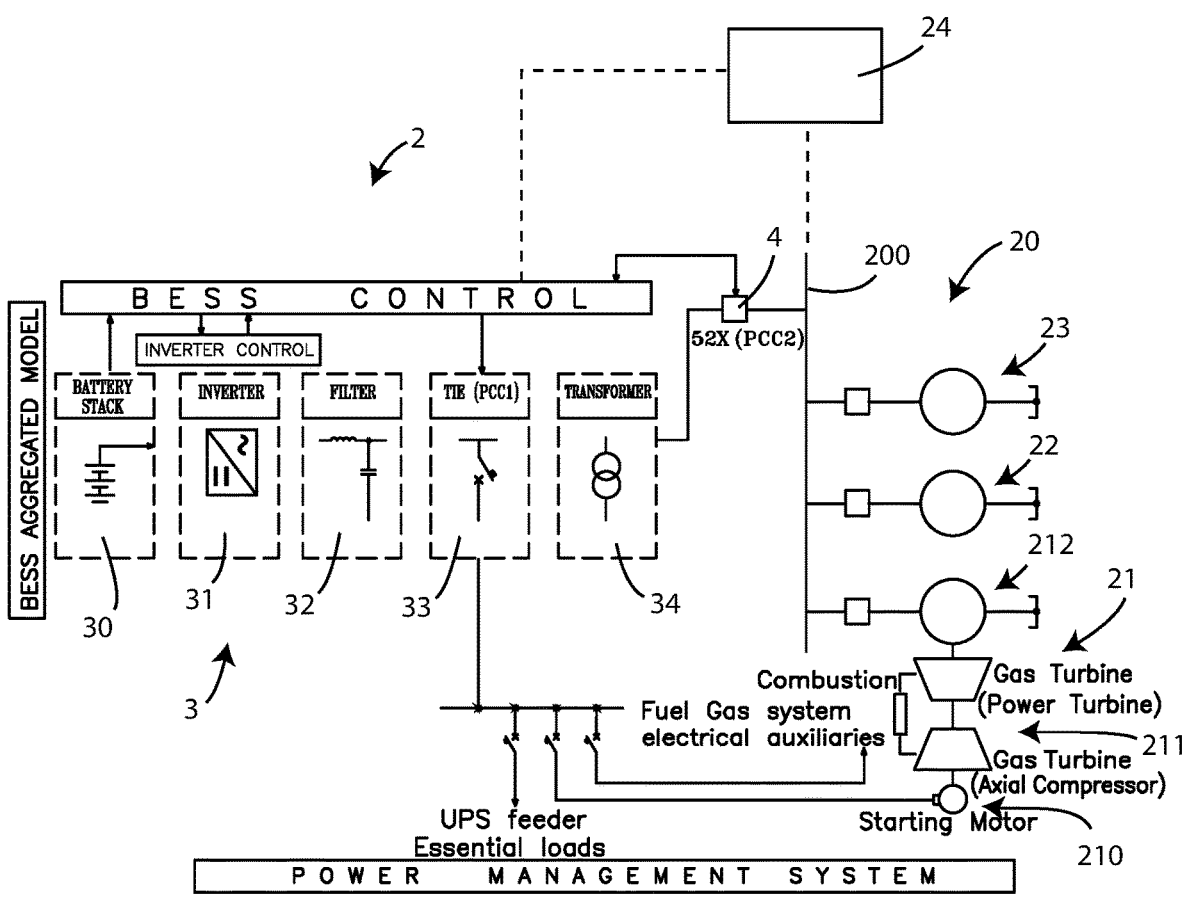
FIG. 1 illustrates a schematic view of a battery energy storage system installed in an offshore plant, according to a first embodiment.

Referring now to the drawings, FIG. 1 shows a schematic view of a battery energy storage system or BESS 3 installed in an offshore plant 2, such as an islanded power plant, a floating production storage and offloading (FPSO) unit or a platform.

The offshore plant 2 comprises a power grid 20 for supplying and distributing energy to the offshore plant 2, wherein the power grid 20 comprises in its turn power generation sources 21, 22, 23 for generating the energy and an electrical busbar or busbar 200.

According to the present disclosure, there are three power generation sources 21, 22, 23. However, in other embodiments the offshore plant 2 can be provided with a different number of power generation sources 21, 22, 23 as well as located in other positions.

In particular, each power generation source 21, 22, 23 comprises a power module 211, 221, 231 such as a gas turbine, a steam turbine and the like, an engine or gas turbine starting motor 210, 220, 230, which is connected to the gas turbine 211, 221, 231, and a generator 212, 222, 232, which is also connected to the gas turbine 211, 221, 231.

More specifically, each engine 210, 220, 230 is capable of starting the relevant gas turbine 211, 221, 231 when it is powered, while each generator 212, 222, 232 produces the electrical energy for any possible necessity at the offshore plant 2.

The electrical busbar 200 of the power grid 20 comprises a conductor or an assembly of conductors for collecting electric power from the incoming feeders and distributes them to the outgoing feeders. In other words, the electrical busbar 200 is a type of electrical junction in which all the incoming and outgoing electrical current meets.

Therefore, the electrical busbar 200, which is connected to each power generation source 21, 22, 23, allows the power distribution in the offshore plant 2.

Moreover, the offshore plant 2 further comprises a load 24, which is connected to the busbar 200, and a battery energy storage system or BESS 3.

The load 24 is an electric generator-driven machine, which is capable of generating electrical current while driven. The electric generator-driven machine 24 is adapted to generate electric current when activated by the power generation sources 21, 22, 23, to feed the offshore plant 2, for instance. In other embodiments, such load 24 can be a compressor or a pump, depending on the necessities.

The battery energy storage system 3, which is connected to the load 24 and the power grid 20, is capable of restoring the energy conditions of the power grid 20 prior to a power outage between the load 24 and the power grid 20.

The power outage or power failure (e.g., a blackout) involves an interruption or failure in the supply of electrical power between the load 24 and the power grid 20.

In particular, the battery energy storage system 3 comprises a plurality of rechargeable batteries 30 such as lithium batteries and the like. The batteries 30 of the battery energy storage system 3 allow to supply the energy to the power generation sources 21, 22, 23, to start them up, so as to restore the energy conditions on the power grid 20 prior to the power outage. In some embodiments, the battery energy storage system 3 can be composed by several battery packs and multiple batteries inter-connected to reach the target value of current and voltage.

Moreover, the battery energy storage system 3 further comprises a plurality of inverters 31 for converting an input direct current into an output alternating current, a plurality of filters 32 for reducing disturbances on the supply line, a connecting device 33 for connecting the battery energy storage system 3 with the engine 201 and a plurality of transformers 34 connected to the busbar 200. In particular, such components of the battery energy storage system 3 cooperate together to transform the electrochemical stored energy of the batteries 30 in a stable alternating current output elevated at the voltage needed at interconnections point(s) with the power grid 20.

Furthermore, as shown in FIG. 1, the battery energy storage system 3 is connected to the busbar 200 of the power grid 20 by means of a switching and detecting device 4.

More specifically, the switching and detecting device 4 comprises a detecting device (not shown in the figures) for detecting the voltage drop on the busbar 200 due to the power outage that occurs between the load 24 and the power grid 20.

Moreover, the switching and detecting device 4 further comprises an electrical device such as a switch and the like (not shown in the figures) for establishing or interrupting an electrical path between the battery energy storage system 3 and the busbar 200 based on the detection by the detecting device.

Therefore, when the detecting device detects a voltage drop on the busbar 200, the switch establishes an electrical path between the battery energy storage system 3 and the busbar 200 to allow the power injection from the battery storage system 3 to the power grid 20. Instead, when the detecting device does not detect any voltage drop on the busbar 200, the switch interrupts the electrical path between the battery energy storage system 3 and the busbar 200.

Figure 2:
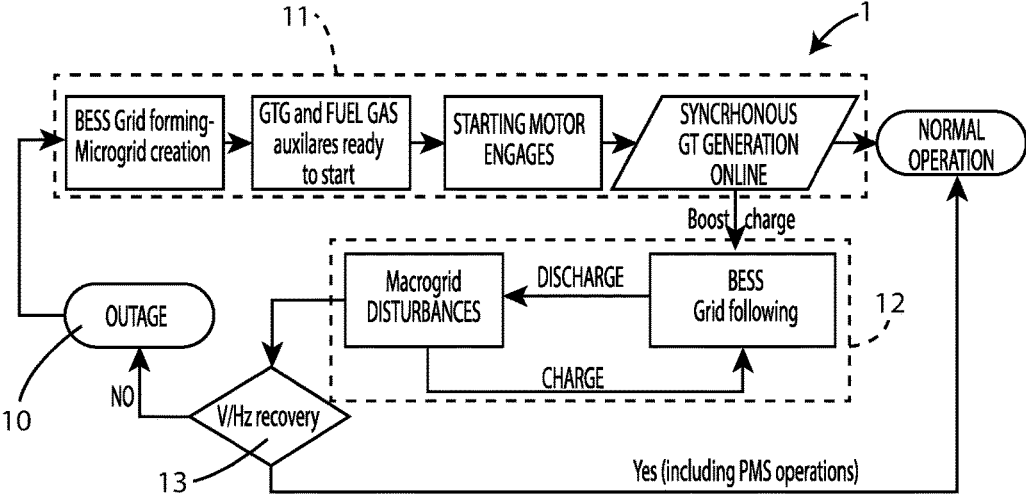
FIG. 2 illustrates a flowchart of a method for performing a start-up of the offshore plant with the battery energy storage system of FIG. 1.

FIG. 2 shows the steps of a method 1 for performing a start-up of the offshore plant 2, according to the present disclosure.

In particular, as shown in FIG. 2, in the method 1, a first step of detecting 11 by the switching and detecting device 4, the power outage occurring between the load 24 and the power grid 20, is carried out. As said, the switching and detecting device 4 is capable of detecting any voltage drop on the busbar 200 due to the power outage that occurs between the load 24 and the power grid 20.

Then, a step of injecting 12 energy to the power generation sources 21, 22, 23 to start them up, so as to restore the energy conditions on the power grid 20 prior to the power outage, is carried out.

More specifically, the injecting step 11 provides the re-energization of a busbar 200 connected to the battery energy storage system 3 and gas turbine generators 212, 222, 232 connected to the gas turbines 211, 221, 231, in order to start the engines 210, 220, 230 of the gas turbines 211, 221, 231 of the power generation sources 21, 22, 23 by means of the power from batteries 30 of the battery energy storage system 3.

Subsequently, a step of compensating 12 the fluctuations of the power grid 20 through a charge/discharge process of the battery energy storage system 3, is carried out. The fluctuations of the power grid 20 can be voltage and/or frequency fluctuations.

The method 1 also comprises a step of comparing 13 the value of each fluctuation of the power grid 20 with a predeterminate threshold value.

If the value of the fluctuation exceeds the predeterminate threshold value, a power outage is detected and, thus, the detecting step 10 is carried out.

Alternatively, if the value of the fluctuation does not exceed the predeterminate thresh-old value, only fluctuations or disturbances are detected, the compensating step 12 is carried out.

Figure 3:
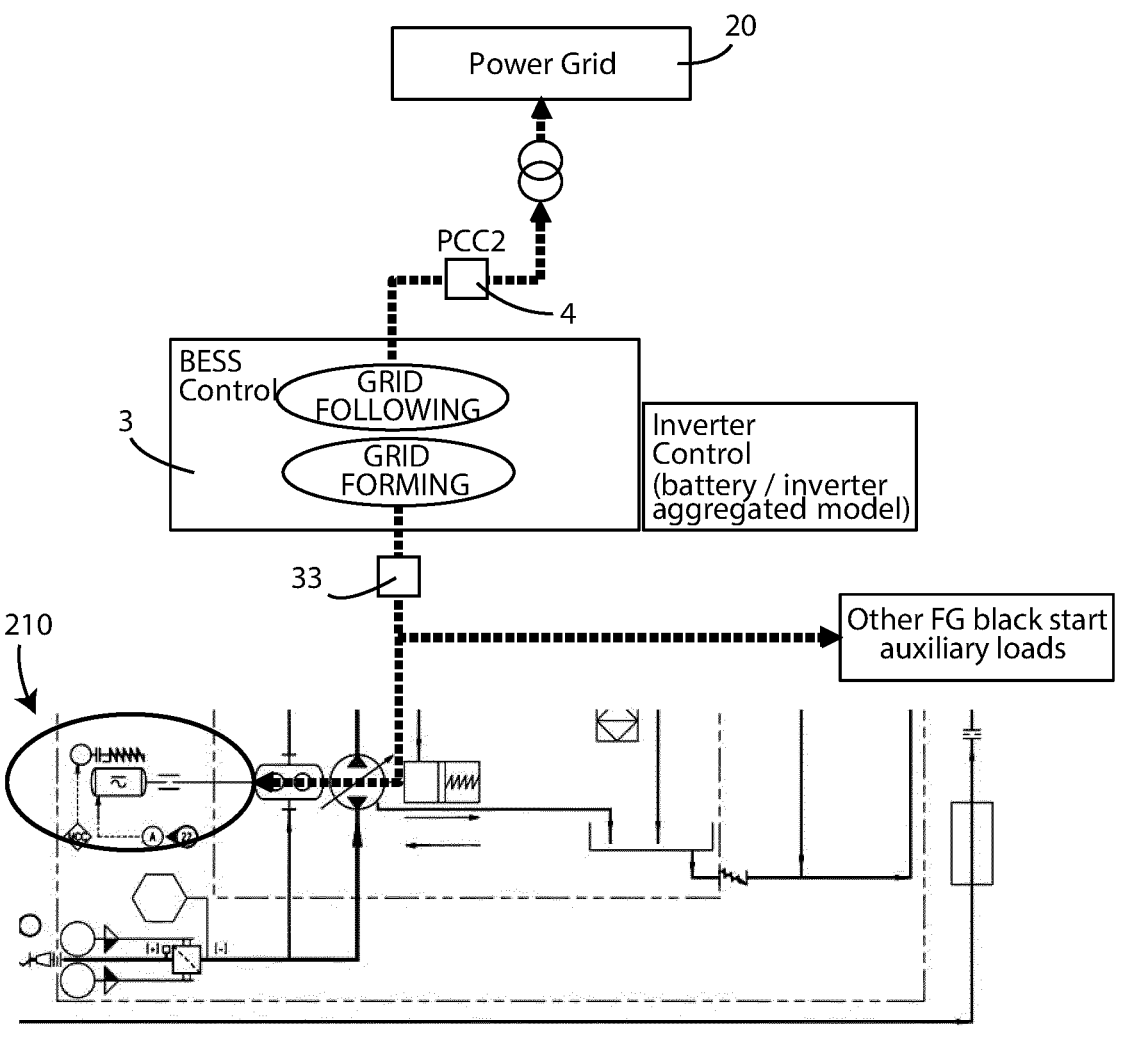
FIG. 3 illustrates an operating diagram of the battery energy storage system, according to the method of FIG. 2.

FIG. 3 shows an operating diagram of the battery energy storage system 3, according to the method 1 described.

As said, on one hand, the battery energy storage system 3 is capable of compensating 12 the fluctuations of the power grid 20 through a charge/discharge process of its batteries 30.

On the other hand, the battery energy storage system 3 is capable of injecting 11 energy to the busbar 200 connected to the gas turbines 211, 221, 231 and gas turbine generators 212, 222, 232, in order to start the engines 210, 220, 230 of the gas turbines 211, 221, 231 by means of the power from batteries 30.

An advantage of the present disclosure is that of restoring the initial energy condition of the offshore plant following a power outage by means of the battery energy storage system.

A further advantage of the present disclosure is that of compensating the fluctuations of the power grid through a charge/discharge process of the battery energy storage system.

While aspects of the invention have been described in terms of various specific embodiments, it will be apparent to those of ordinary skill in the art that many modifications, changes, and omissions are possible without departing and scope of the claims. In addition, unless specified otherwise herein, the order or sequence of any process or method steps may be varied or re-sequenced according to alternative embodiments.

Reference has been made in detail to embodiments of the disclosure, one or more examples of which are illustrated in the drawings. Each example is provided by way of explanation of the disclosure, not limitation of the disclosure. In fact, it will be apparent to those skilled in the art that various modifications and variations can be made in the present disclosure without departing from the scope or spirit of the disclosure. Reference throughout the specification to "one embodiment" or "an embodiment" or "some embodiments" means that the particular feature, structure or characteristic described in connection with an embodiment is included in at least one embodiment of the subject matter disclosed. Thus, the appearance of the phrase "in one embodiment" or "in an embodiment" or "in some embodiments" in various places throughout the specification is not necessarily referring to the same embodiment(s). Further, the particular features, structures or characteristics may be combined in any suitable manner in one or more embodiments.

When elements of various embodiments are introduced, the articles "a", "an", "the", and "said" are intended to mean that there are one or more of the elements. The terms "comprising", "including", and "having" are intended to be inclusive and mean that there may be additional elements other than the listed elements.

The invention claimed is:

1. A method for performing a start-up of an offshore plant, wherein the offshore plant comprises:
   a power grid for supplying and distributing energy, wherein the power grid comprises a power generation source for generating the energy, a load driven by the power generation source and connected to the power grid,
   a battery energy storage system connected to the power grid and to the load, and
   a switching and detecting device connected to the power grid,
   the method comprising the steps of:
   detecting by the switching and detecting device, a power outage between the load and power grid,
   injecting by the battery energy storage system, the energy to the power generation source to start it up, so as to restore the energy conditions on the power grid prior to the power outage,
   wherein the injecting step provides the re-energization of a busbar connected to the battery energy storage system and a generator connected to a gas turbine, in order to start an engine of the gas turbine of the power generation source by means of the power from batteries of the battery energy storage system, and
   compensating the fluctuations of the power grid through a charge/discharge process of the battery energy storage system.

2. The method of claim 1, wherein the method further comprises the step of comparing the value of each fluctuation of the power grid with a predeterminate threshold value, such that:
   if the value of the fluctuation exceeds the predeterminate threshold value, the detecting step is carried out; or
   if the value of the fluctuation does not exceed the predeterminate threshold value, the compensating step is carried out.

3. The method of claim 1, wherein the fluctuations of the power grid are voltage and/or frequency fluctuations.

4. The method of claim 1, wherein the battery energy storage system comprises a plurality of inverters for converting an input direct current into an output alternating current, a plurality of filters for reducing disturbances on the supply line, a connecting device and a plurality of transformers.

5. An offshore plant such as a platform and the like, comprising
   a power grid for supplying and distributing energy, wherein the power grid comprises a power generation source for generating the energy,
   a load driven by the power generation source and connected to the power grid,
   a battery energy storage system connected to the power grid and to the load, and
   a switching and detecting device connected to the power grid,
   wherein the switching and detecting device is capable of detecting a power outage between the load and power grid, and
   wherein the battery energy storage system is capable of injecting the energy to the power generation source to start it up, so as to restore the energy conditions on the power grid prior to the power outage.

6. The offshore plant of claim 5, wherein the power generation source comprises a gas turbine, a generator connected to the gas turbine and an engine connected to the gas turbine for start-up the gas turbine.

* * * * *